US012165047B2

United States Patent
Lee et al.

(10) Patent No.: US 12,165,047 B2
(45) Date of Patent: Dec. 10, 2024

(54) MEMORY-INTEGRATED NEURAL NETWORK

(71) Applicant: Rambus Inc., San Jose, CA (US)

(72) Inventors: Dongyun Lee, Sunnyvale, CA (US); Brent S. Haukness, Sunnyvale, CA (US)

(73) Assignee: Rambus Inc., San Jose, CA (US)

( * ) Notice: Subject to any disclaimer, the term of this patent is extended or adjusted under 35 U.S.C. 154(b) by 799 days.

(21) Appl. No.: 17/424,254

(22) PCT Filed: Jan. 23, 2020

(86) PCT No.: PCT/US2020/014853
§ 371 (c)(1),
(2) Date: Jul. 20, 2021

(87) PCT Pub. No.: WO2020/159800
PCT Pub. Date: Aug. 6, 2020

(65) Prior Publication Data
US 2022/0114431 A1    Apr. 14, 2022

Related U.S. Application Data

(60) Provisional application No. 62/906,222, filed on Sep. 26, 2019, provisional application No. 62/827,716, (Continued)

(51) Int. Cl.
*G06N 3/065*    (2023.01)
*G06F 7/544*    (2006.01)
(Continued)

(52) U.S. Cl.
CPC ........... *G06N 3/065* (2023.01); *G06F 7/5443* (2013.01); *G06F 17/16* (2013.01); *G06J 1/00* (2013.01)

(58) Field of Classification Search
CPC .......... G06J 1/00; G06F 7/5443; G06F 17/16; G06N 3/065
See application file for complete search history.

(56) References Cited

U.S. PATENT DOCUMENTS 5,956,703 A    9/1999    Turner et al.
6,298,366 B1    10/2001    Gatherer et al.
(Continued)

OTHER PUBLICATIONS

Du, Yuan et al., "An Analog Neural Network Computing Engine Using CMOS-Compatible Charge-Trap-Transistor (CTT)", In: IEEE Transactions on Computer-Aided Design of Integrated Circuits and Systems, Jul. 24, 2018 (Jul. 24, 2018), Retrieved on Mar. 23, 2020 (Mar. 23, 2020) from <https://arxiv.org/ftp/arxiv/papers/1709/1709.06614.pdf>, entire document, 12 pages.
(Continued)

*Primary Examiner* — Michael D. Yaary
(74) *Attorney, Agent, or Firm* — Charles Shemwell (57) ABSTRACT

An integrated-circuit neural network includes chain of multiply-accumulate units co-located with a high-bandwidth storage array. Each multiply accumulate includes a digital input port, analog input port and multiply-adder circuitry. The digital input port receives a matrix of digital-weight values from the storage array and the analog input port receives a counterpart matrix of analog input signals, each analog input signal exhibiting a respective electronic current representative of input value. The multiply-adder circuitry generates a matrix of analog output signals by convolving the matrix of digital-weight values with the matrix of analog input signals including, for each analog output signal within the matrix of analog output signals, switchably enabling weighted current contributions to the analog output signal based on logic states of on respective bits of one or more of the digital-weight values.

22 Claims, 7 Drawing Sheets

Die-Integrated Convolutional Neural-Net (CNN) Engine with high-bandwidth digital weight storage and low-latency current-mode multiply-accumulate

Related U.S. Application Data filed on Apr. 1, 2019, provisional application No. 62/797,489, filed on Jan. 28, 2019.

(51) Int. Cl.
*G06F 17/16* (2006.01)
*G06J 1/00* (2006.01)

(56) References Cited

U.S. PATENT DOCUMENTS

| | | |
|---|---|---|
| 6,424,194 B1 | 7/2002 | Hairapetian |
| 6,606,614 B1 | 8/2003 | Paillet et al. |
| 10,073,733 B1 | 9/2018 | Jain et al. |
| 2005/0165876 A1 | 7/2005 | Mukaida et al. |
| 2018/0075339 A1* | 3/2018 | Ma .......................... G06N 3/06 |
| 2018/0121130 A1 | 5/2018 | Li et al. |

OTHER PUBLICATIONS

Garland, James et al., "Low Complexity Multiply-Accumulate Units for Convolutional Neural Networks With Weight-Sharing", In: ACM Transactions on Architecture and Code Optimization (TACO), May 1, 2018 (May 1, 2018), Retrieved on Mar. 23, 2020 (Mar. 23, 2020) from <https://arxiv.org/pdf/1801.10219.pdf> entire document, 24 pages.

Notification of Transmittal of the International Search Report and the Written Opinion of the International Searching Authority, or the Declaration with Mail Date Apr. 20, 2020 re: Int'l Appln. No. PCT/US2020/014853, 15 pages.

* cited by examiner

Fig. 1  Die-Integrated Convolutional Neural-Net (CNN) Engine with high-bandwidth digital weight storage and low-latency current-mode multiply-accumulate

Fig. 5 Example MAC implementation for L=M=N=3, 4-bit depth

MEMORY-INTEGRATED NEURAL NETWORK

INCORPORATION BY REFERENCE

This application hereby incorporates by reference U.S. Provisional Patent Application No. 62/797,489 filed Jan. 28, 2019, U.S. Provisional Patent Application No. 62/827,716 filed Apr. 1, 2019, and U.S. Provisional Patent Application No. 62/906,222 filed Sep. 26, 2019.

TECHNICAL FIELD

The present disclosure relates to the field of digital signal processing and more specifically to high bandwidth neural network implementation.

DRAWINGS

The various embodiments disclosed herein are illustrated by way of example, and not by way of limitation, in the figures of the accompanying drawings and in which like reference numerals refer to similar elements and in which.

DETAILED DESCRIPTION

In various embodiments disclosed herein, a multi-bank memory array outputs digital operands to a chain of hybrid analog/digital multiply-accumulate (MAC) units to implement a high bandwidth neural-network engine. In a number of implementations, the MAC units and memory array are instituted within a single integrated-circuit die to enable wide-interface, bank-parallel data transfer from the memory array to the MAC chain, obviating time-consuming (and I/O-width constraining) data serialization. In other embodiments, wide-interface chip-to-chip data exchange, by way of through-silicon vias for example, enables high-bandwidth, bank-parallel data transfer between a memory IC and a MAC-chain IC. In both single-die and multi-die-package embodiments, the hybrid analog-digital MAC units execute current-mode multiply accumulate operations in which digital operands from the memory array are applied without conversion (i.e., in digital form) to selectively enable binary-weighted current contributions to a wire-summed output—an approach that both multiplies the digital operands with counterpart analog (current-mode) operands and wire-sums multiple parallel multiplications with extremely low latency (high speed) and small circuit footprint. In a number of embodiments, current-mode latches are disposed at respective interfaces between MAC units, with each "i-latch" capturing the current-mode result from a source MAC unit and forwarding the current-mode value to a multiply-accumulate circuit within the destination MAC unit, all without digitization (i.e., no analog-digital conversion at interface). By this arrangement, a pipelined sequence of multiply-accumulate operations ripples through the MAC-unit chain over a corresponding sequence of operation intervals, top, with (i) each MAC unit generating a new output result (according to the input from its upstream neighbor) in each top interval, and (ii) all MAC units operating on values corresponding to respective neural-net operations during a given top interval. That is, a neural-net operation implemented by N multiply-accumulate stages will complete in N top intervals and individual neural-net operations may be commenced and thus complete in successive top intervals (i.e., multiple neural-net operations propagating through MAC-unit chain concurrently, staggered by time top to implement a neural-net pipeline) such that the rate at which neural-net operations are completed (operational throughput) is 1/top.

Figure 1:
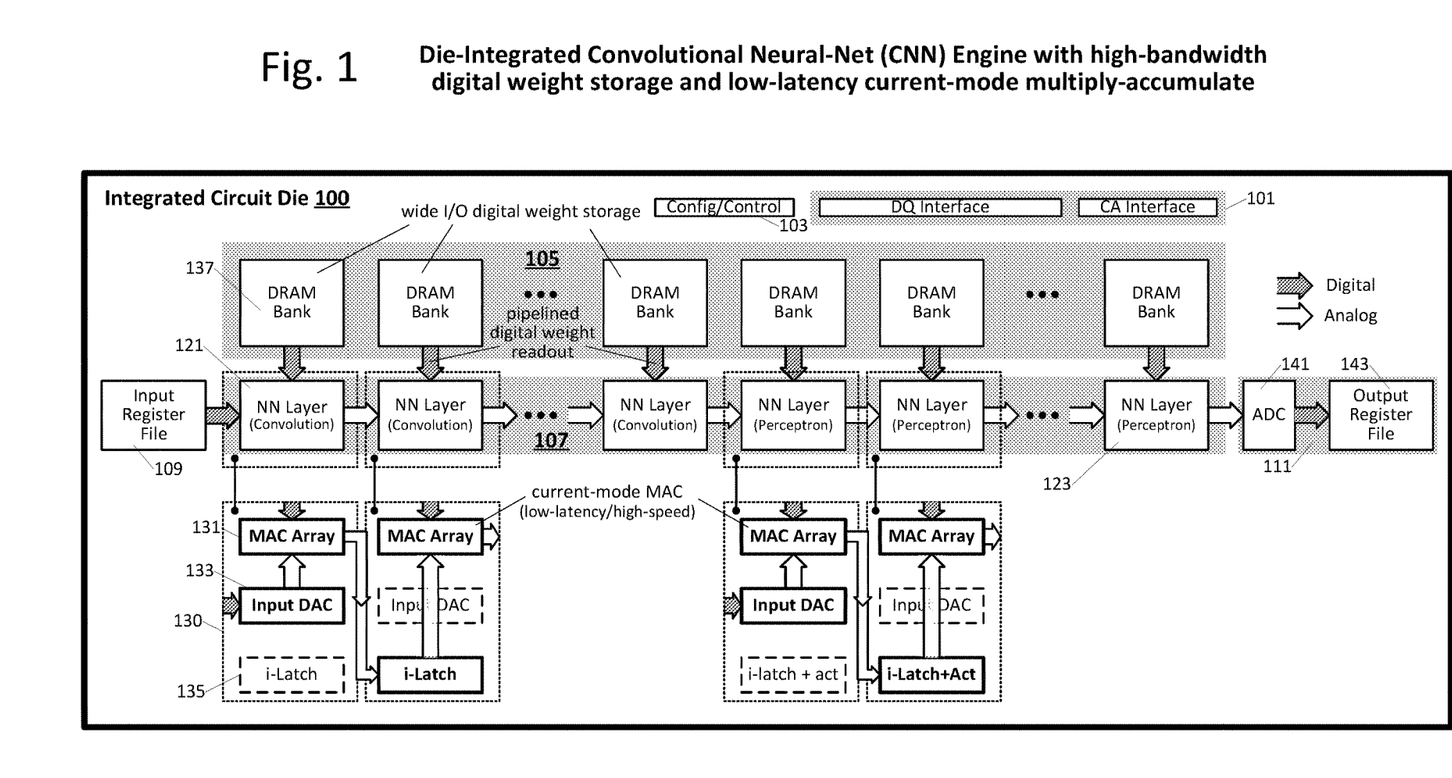
FIG. 1 illustrates an embodiment of a die-integrated convolutional neural-net engine.

FIG. 1 illustrates an embodiment of a die-integrated (100) convolutional neural-net engine having a signaling interface 101, configuration/control circuitry 103, high-bandwidth DRAM (dynamic random access memory) digital weight storage 105, multi-layer neural pipeline 107, input register file 109, and output stage 111, the latter implemented by an analog-to-digital converter (ADC) 141 and output register file 143. Digital weights from the DRAM (a multi-bank DRAM in this case, though single-bank devices and/or memory arrays implemented by SRAM, Flash cells or any other practicable integrated-circuit storage may be used) are supplied to a sequence (chain) of neural-net component layers (within neural pipeline 107) that include both convolutional layers 121 and fully-connected (perceptron) layers 123 in configurable quantities. In the embodiment shown, each component layer of the neural pipeline (i.e., "NN Layer") is implemented by a respective multiply-accumulate unit ("MAC unit") 130 having a multiply-accumulate array 131 together with an input DAC (digital-to-analog converter) and/or current-mode latch (i-latch). In the FIG. 1 embodiment, for example, all MAC units 130 are identically implemented—each having a MAC array 131, selectively-enabled input-DAC 133 and selectively-enabled i-latch 135 (disabled elements shown in dashed outline)—and interconnected by configurable switching circuitry to implement an application-tailored chain of neural-net layers.

Still referring to FIG. 1, input register file 109 supplies a digital-array input to a current-mode input DAC (133) within an initial layer of neural pipeline 107. The DAC converts the digital input to a set of currents (having amplitudes according to respective digital values that constitute the digital array) that flow into current-mode MAC array 131 for multiplication with constituent digital values of a weighting array output from the DRAM (e.g., output from a bank 137 of the DRAM corresponding to the neural-net layer). MAC array 131 performs a matrix multiply in which input currents corresponding to values that constitute a given column 'j' of the input data array are multiplied with digital weighting values corresponding to a row 'i' of the weighting data array to yield a set of current-mode products that are wire-summed into an output current corresponding to row 'i' and column T of an output data array. For example, assuming an N×N input matrix and N×N weighting data matrix (non-square input and/or weighting matrices may also be supplied), each MAC array performs $N^3$ two-input multiply operations and $N^2$ N-input addition operations to produce an N×N current-mode output matrix—that is, executing N multiply operations for each of the $N^2$ elements of the N×N output matrix and summing N current-mode multiplication results (products) for each element of the N×N output matrix. The output currents generated by MAC array during a given operation interval (tOP) are supplied to and captured within a current-mode latch (in the downstream neural-net layer) at the conclusion of the top interval. At the start of the ensuing tOP interval, the current-mode latch reproduces the captured currents (the inbound currents) at the current-mode input of the local MAC array (i.e., the MAC array within the same neural-net layer as the input latch). By this arrangement, digitization of the MAC array output is avoided at all layer-to-layer interfaces of the neural pipeline, reducing latency, power consumption and die-area footprint (i.e., no analog-to-digital (A/D) and digital-to-analog (D/A) conversion circuitry at layer interface).

In a number of embodiments, weighting values to be applied within the neural pipeline during inference or other operations are iteratively adjusted in one or more training events before being written into the DRAM in final (hardened) form. In one implementation, for example, weighting values are generated off-die during neural-network training and then written to DRAM 105 via command/address (CA) and data (DQ) interfaces (i.e., constituents of signaling interface 101), the former receiving memory write commands and the latter receiving weighting values. In other embodiments, the weighting values may be adjusted in-situ during neural-net training, with weighting values read out of DRAM 105 following a training iteration, adjusted in accordance with neural pipeline results (and other information) and written back to DRAM 105 in a sequence of memory read and write transactions. In addition to read/write commands, the command/address interface may also receive configuration commands and data (configuration data may alternatively or additionally be conveyed via the DQ interface) to be programmed within configuration/control circuitry 103. For example, in implementations that enable configurable interconnection and/or function between and within otherwise fungible/interchangeable neural-net layers (121, 123), configuration data may be programmed within configuration/control circuitry 103 to switchably interconnect layers (and thus form a neural pipeline), enable input-DAC operation at least within an initial layer (start of neural pipeline 107), switchably connect outputs of a final layer of the neural pipeline to output stage 111 (i.e., to ADC 141 and indirectly to output register file 143), configure individual layers for convolution or perceptron (or other) functionality, etc. Also, input data may be stored within DRAM 105 in alternative embodiments together with or instead of the digital weighting values. In the former case (input data and digital weighting data co-located within DRAM 105, either in respective storage banks or within separate regions of individual storage banks), input register file 109 may be omitted. In the latter case (input data stored in DRAM 105 instead of digital weights), the digital weighting values may be stored within input register file 109, another DRAM or other on-die or off-die memory dedicated to weighting value storage.

Figure 2:
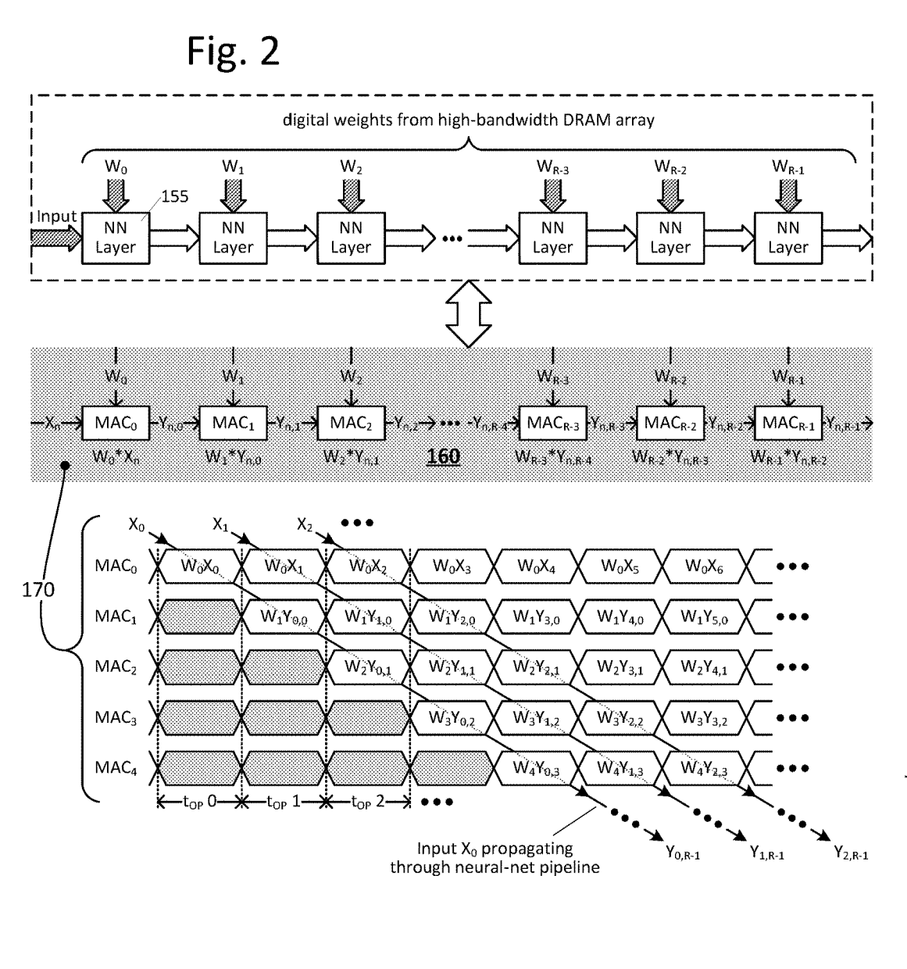
FIG. 2 illustrates an exemplary pipelined data flow through a neural pipeline according to FIG. 1.

FIG. 2 illustrates an exemplary pipelined data flow through a neural pipeline according to FIG. 1, showing (as in FIG. 1) digital and analog signal paths with and without shading, respectively. In this case, each of 'R' neural-net layers 155 receives a respective set of digital weighting values ($W_0$-$W_{R-1}$) and all but the initial (first-in-chain) neural-net layer receives, as its input, the analog (current-mode) output of the preceding layer. The computational flow implemented by the neural pipeline is shown at 160. That is, an input matrix supplied to the neural-net pipeline during operational interval 'n' (i.e., $X_n$) is convolved with weighting data matrix $W_0$ in MAC unit "$MAC_0$" to produce output matrix $Y_{n0}$, where subscript 'n' denotes the operational interval in which the neural processing commenced, subscript '0' denotes the MAC unit from which the output result was generated, and '*' denotes a convolution operation. Thus, the $Y_{n0}$ output of unit $MAC_0$ is supplied to downstream unit $MAC_1$, which in turn convolves $Y_1$ with weighting matrix $W_1$ to produce output $Y_{n1}$, supplying that output to next-stage unit $MAC_2$ for convolution with weighting matrix $W_2$ and so forth.

Detail view 170 of FIG. 2 demonstrates the pipelined nature of the neural-net operations executed within the chain of MAC units. An initial neural-net operation commences with input $X_0$ during operational interval top 0 and ripples through the MAC chain interval-by-interval to produce a neural-net result $Y_{0,R-1}$ (where the '0' subscript denotes the start-time of the neural net operation, and the 'R-1' subscript denotes the final-stage MAC unit). A second neural-net operation commences with input $X_1$ during operational interval top 1 and ripples through the chain of MAC units one operational interval (top) behind the initial neural-net operation to produce neural-net result $Y_{1,R-1}$ one $t_{OP}$ interval after neural-net result $Y_{0,R-1}$. In the fully-loaded sequence shown, neural-net operations are commenced in each of the following intervals to yield, after an initial latency equal to R●$t_{OP}$, one neural-net result per top interval.

Figure 3:
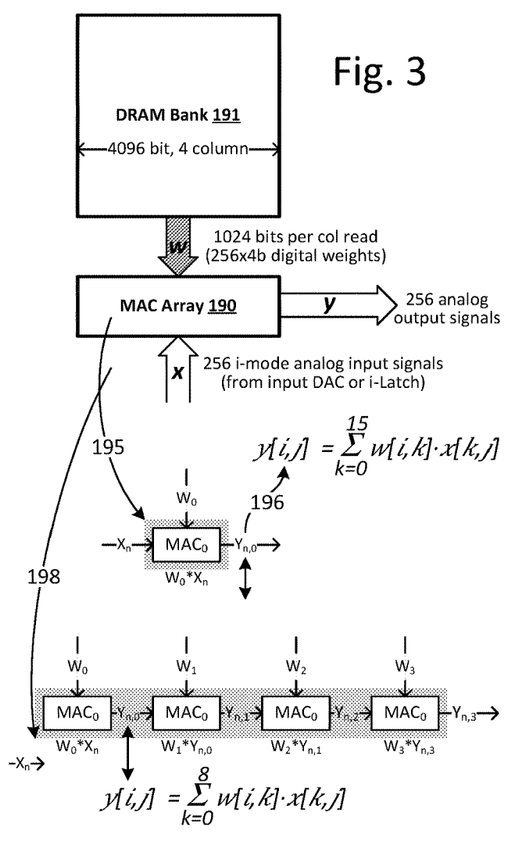
FIG. 3 illustrates an exemplary data flow with respect to an exemplary multiply-accumulate (MAC) array that convolves a 16×16 (256-element) input matrix with a 16×16 digital weight matrix.
Figure 4:
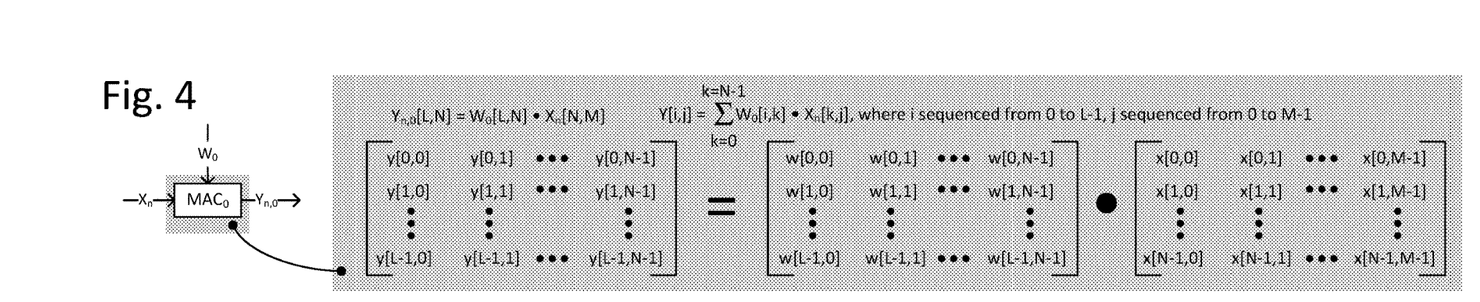
FIG. 4 illustrates a more general multiply-accumulate operation that may be implemented within MAC units presented herein to convolve an M×N weighting data array with an N×M input data array.

FIG. 3 illustrates an exemplary data flow with respect to an exemplary MAC array 190 that convolves a 16×16 (256-element) input matrix with a 16×16 digital weight matrix. In the depicted example, the digital weight matrix consists of 256 4-bit weight values obtained by a single column-read from a wide-I/O DRAM bank 191 (i.e., a constituent of a multi-bank DRAM as discussed above) having four 1024-bit columns per open page (activated row). The digital weights (W) are convolved within a corresponding array of 16×16=256 current-mode input signals (X) to produce 256 current-mode output signals—that is, a 16×16 current-mode output array (Y). As shown at 195 and 196, each output current y[i,j] is generated by summing the products of sixteen multiplication operations ($\Sigma_w$[i,k]●x[k,j] for k=0 to 15, where '●' denotes multiplication and '$\Sigma$' denotes summation) so that the MAC array executes $16^3$=2048 two-input multiplications and $16^2$=256 summation operations to produce the 256-element current-mode output array. Smaller or larger input arrays may be provided (and correspondingly smaller or larger output arrays generated) in alternative embodiments, including non-square arrays (e.g., N×M input array and M×N digital-weight array). Detail view 198, for example, shows an implementation in which the 256 4-bit weighting values (1024 bits of weighting data) are distributed 64 values apiece to four MAC units within the neural net chain (i.e., four neural-net layers per DRAM bank instead of one-for-one as shown in FIG. 1), with each such MAC unit implementing an 8×8 matrix convolution. In other embodiments, the bit-depth of individual weighting values may be increased (e.g., to 8 bits, 16 bits, 32 bits, etc.) or decreased, with corresponding adjustment in matrix dimension (or same dimension with DRAM data being drawn from wider column I/O or from two or more banks per MAC unit). FIG. 4 illustrates the more general multiply-accumulate operation that may be implemented within MAC units presented herein to multiply an L×N weighting data array with an N×M input data array to produce an L×M output data array ('●' denoting multiplication).

Figures 5, 6:
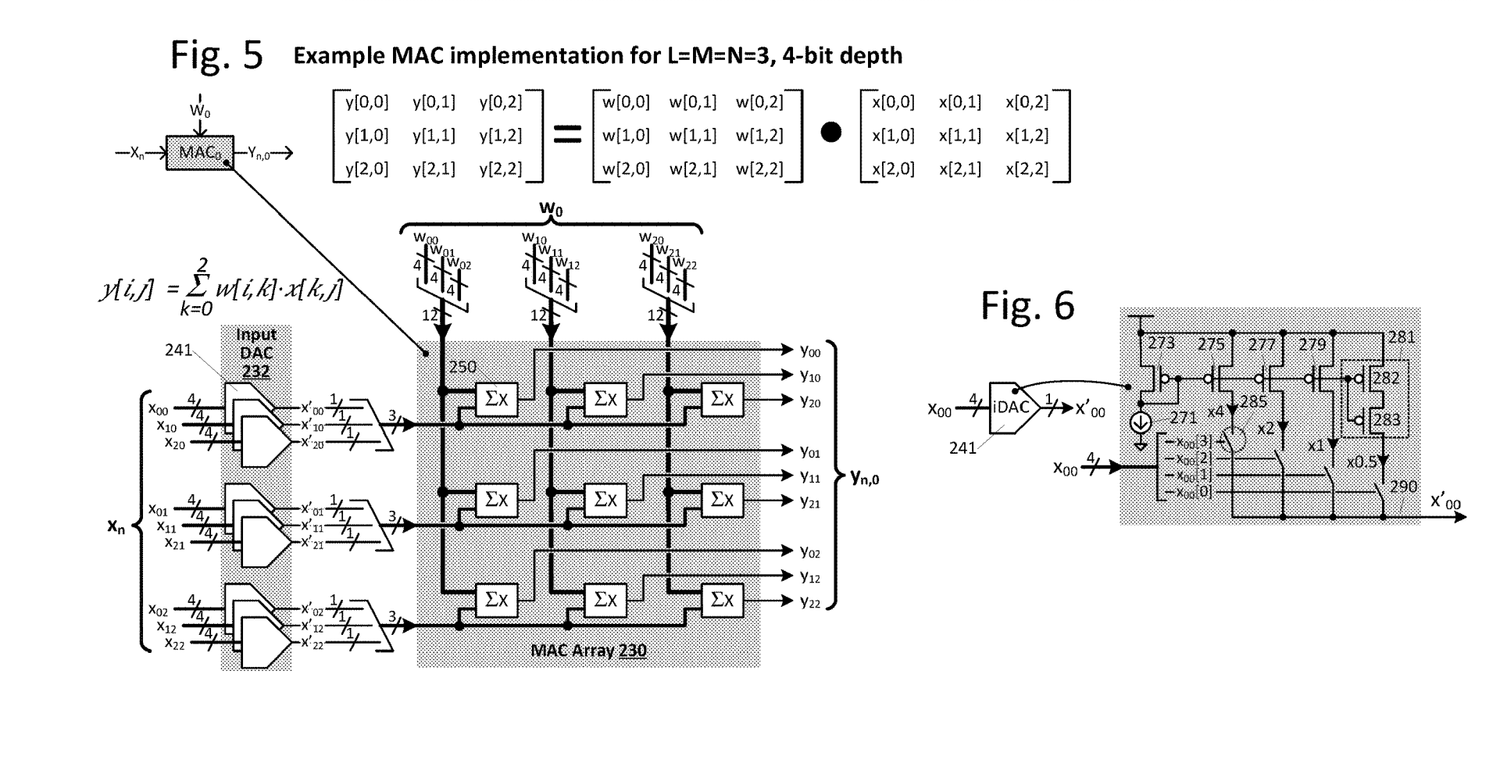
FIG. 5 illustrates embodiments of a fully-parallel multiply-accumulate array and input-DAC (digital-to-analog converter) in the context of a 3×3 matrix convolution with 4-bit input and weighting data values.
FIG. 6 illustrates an embodiment of a current-mode input DAC that may be used to implement the multi-output DAC shown in FIG. 5.

FIG. 5 illustrates embodiments of a fully-parallel multiply-accumulate array 230 and input-DAC 232 in the context of a 3×3 matrix convolution with 4-bit input and weighting data values. Input DAC 232 includes nine digital-to-analog (D/A) converters 241 coupled to receive respective 4-bit input data elements (i.e., 3×3 input array containing 9 elements subscripted by row and column). Each D/A converter 241 generates a single-signal current-mode output ($x'_{ij}$) having one of 16 current levels in accordance with the 4-bit digital input ($x_{ij}$). The three current-mode signals corresponding to each column of the input array (i.e., $x'_{00}|x'_{10}|x'_{20}$; $x'_{01}|x'_{11}|x'_{21}$; and $x'_{02}|x'_{12}|x'_{22}$) are supplied to each of three multiply-adder elements 250 within the MAC array (nine multiply-adders 250 in all) where they are multiplied with respective sets of three digital weights corresponding to the three rows of the weighting data array (i.e., $w'_{00}|w'_{01}|w'_{02}$; $w'_{10}|w'_{11}|w'_{12}$; and $w'_{20}|w'_{21}|w'_{22}$). As explained below, each multiply-adder 250 multiplies the three incoming current-mode input values with the three incoming digital weight values to produce a set of N=3 product-currents (currents that reflect the multiplication), wire-summing those currents to yield a respective current-mode output value. Thus, in the upper row of MAC array 230, the leftmost multiply-adder 250 generates current-mode output $y_{00}$, the center multiply-adder generates current-mode output $y_{10}$, and rightmost multiply-adder generates current-mode output $y_{20}$—a first column of current-mode data within the output array. The outputs for the middle and bottom rows of multiply-adders generate like sets of current-mode outputs corresponding to the second and third columns of the output matrix.

FIG. 6 illustrates an embodiment of a current-mode input DAC 241 (i.e., that may be used to implement multi-output DAC 232 of FIG. 5) having a current source 271 and diode-configured transistor 273 coupled in a current-mirror configuration with binary-weighted transistors 275, 277, 279 and 281 (the latter being a series-coupled pair of transistors 282 and 283) that form respective legs of the DAC. Current-source 271 drives the voltage at the gate of transistor 273 (P-MOS transistor in this case to yield a current-source output) and thus at the gates of transistors within all legs of the DAC to a bias point sufficient to establish linearity between the binary-weighted legs (i.e., driving the gate-to-source voltage of transistor 273 to a point corresponding to the current drawn by current-source 271). Respective bits of the four-bit input value ($x_{00}$ in this example) are supplied to switching elements 285 (e.g., N-type or P-type FETS) within respective legs to enable or disable those legs from contributing to a net output current ($x'_{00}$) at node 290. In one embodiment, the current flowing through each leg (assuming that the leg is enabled to contribute current to output node 290) is weighted through transistor size ratioing so that the x4 leg (through transistor 275) contributes twice as much current as the x2 leg which contributes twice as much current as the x1 leg which contributes twice as much current as the x0.5 leg. Note that the x0.5, x1, x2 and x4 current contributions are relative and thus may be viewed as x1, x2, x4, x8 or any other relative set of values that enables production of 16 different current levels (the lowest of which is no current in the depicted example, but instead may be a baseline current). Size ratioing may be achieved by implementing transistors with different width-length (aspect) ratios (e.g., with x4 transistor 275 having a W/L value twice that of x2 transistor 277) and/or by ganging transistors in parallel (e.g., 4 instances of x1 transistor coupled in parallel to implement the x4 leg) or in series (e.g., series-coupled transistors 282 and 283 implemented by respective x1-sized transistors to double the effective length of the net transistor channel and thus yield the x0.5x weighting). Various other current-mode DACs may be implemented in alternative embodiments, including current-sinking DACs, DACs having a bit-depth greater than or equal to four, etc.

Figure 7:
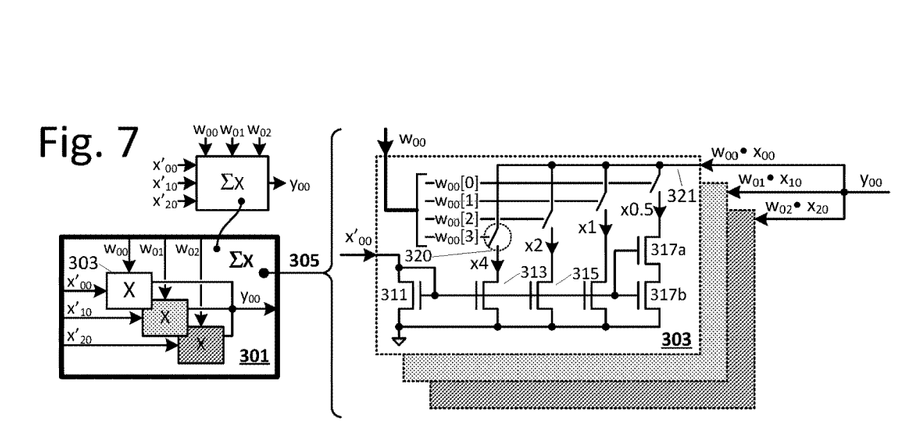
FIG. 7 illustrates an embodiment of a multiplier-adder that may be used to implement individual multiplier-adders shown in FIG. 5.

FIG. 7 illustrates an embodiment of a multiplier-adder 301 that may be used to implement individual multiplier-adders 250 shown in FIG. 5—in this case a multiplier-adder that receives a set of three input currents corresponding to the first column (0) of a 3×3 input matrix and the set of weights corresponding to the first row (0) of a 3×3 weight matrix as in the upper leftmost multiplier-adder shown in in FIG. 5. As shown, multiplier-adder 301 includes a quantity of multiplier units 303 (i.e., according to the convolution dimension N and thus three multiply units in this N=3 example) with each multiplier unit receiving a respective input current from row 'i' of the column of input currents and a respective digital weight from column 'i' of the row of input weights, multiplying those two inputs to yield a current contribution or "product current" at wire-summed output yoo. In one embodiment, shown in detail view 305, each multiplier 303 sinks a weighted version of the input current by selectively coupling (switchably coupling), in accordance with the incoming digital weighting value, binary weighted current-sinking legs of the multiplier to the shared output node ($y_{00}$). More specifically, the input current ($x'_{00}$) is supplied to the drain of a diode-configured transistor 311 (N-FET in this current-sinking example) to establish a desired VGs bias point on the gate of transistor 311 and the gates of transistors 313, 315, and 317a/317b which constitute individual binary-weighted legs of the multiplier (i.e., a current mirror). Note that, despite depiction as a component of multiplier unit 303, diode-configured transistor 311 may supply gate voltages for binary-weighted legs of plural multiplier units distributed within respective multiplier-adders 301 (e.g., multiplier units that respond to the same current-mode input signal and thus, in FIG. 5, multiplier units within multiplier-adders 250 of the same row). That is, diode-configured transistor 311 may be shared among plural multiplier units 303 and thus viewed as separate from any one multiplier unit. Also, as in the input-DAC, the binary weighting of the multiplier legs may be achieved through transistor ganging and/or ratioing of individual transistor width-length dimensions.

Still referring to FIG. 7, individual bits if the digital weight value are supplied in order of significance to respective switching elements 320 (e.g., implemented by N-FET or P-FET devices) disposed between the binary-weighting transistors and output node 321. By this arrangement, the product current generated (sunk) by a given multiplier unit 303 will match the input current multiplied by a digital weighting value of 0-15. In the specific example shown, the unit step is implemented by 0.5x weighting leg (to limit the maximum current) so that the overall range of product currents is 0 to 7.5x the current-mode input in 0.5x increments—sixteen quantization steps (including the no-current zero-value) within an input current having one of 16 different amplitudes. As shown, the outputs of all three multiply units (currents sunk by the multiply units) are wire-summed to produce, as current-mode output value $y_{00}$, a net output that reflects a sum of the three weight-scaled input currents.

Figure 8:
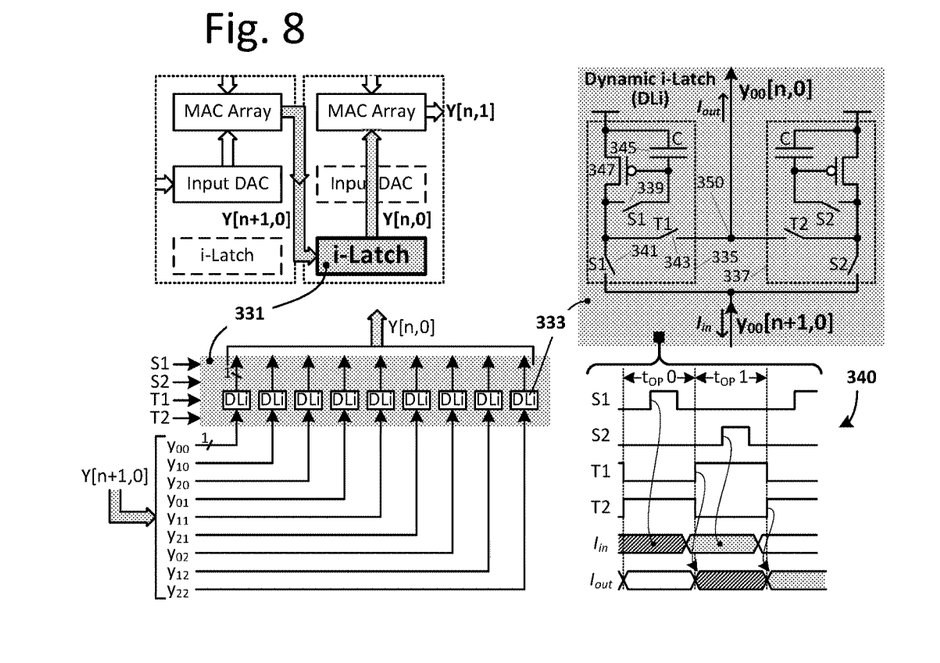
FIG. 8 illustrates an embodiment of a current-mode latch that may be implemented within the MAC units shown in FIG. 1.

FIG. 8 illustrates an embodiment of a current-mode latch 331 that may be implemented within the MAC units shown in FIG. 1. Continuing with the 3×3 (9-element) matrix convolution example, nine current-mode results generated by an upstream multiplier-adder (i.e., $y_{00}$-$y_{22}$) are supplied to respective dynamic current-mode latch elements 333 (DLi) within i-latch 331 and a set of four latch control signals (S1, S2, T1 and T2) are supplied to the latch as a whole and supplied to each DLi element. In the depicted embodiment, each dynamic latch element 333 is implemented by parallel dynamic current mirrors 335 and 337 that are alternated between capture and transmit states in successive top intervals. That is, during a given top interval, one dynamic current mirror is configured for signal capture while the other is configured for signal transmit, with those configurations alternated (swapped, reversed) during each succeeding top interval. Referring to the exemplary control signal and input/output waveforms shown at 340, a capture within a given dynamic current mirror (335 or 337) is implemented by pulsing a sample-enable signal (S1 or S2) while the corresponding transmit-enable (T1 or T2) signal is held low. Thus, after a current-mode result becomes valid at the input of dynamic current mirror 335 during operational interval $t_{OP}$ 0 (i.e., darkly shaded $I_{in}$ in waveform diagram 340), sample-enable signal S1 is pulsed high to close switches 341 and 343 (i.e., drive transistor-implemented switching elements to a conducting state) and thereby capture a voltage on capacitive element 345 (at the gate of transistor 347) according to the current drawn by the input. That is, the input current (a current sunk by an upstream MAC unit) charges capacitive element 345 to a voltage in accordance with the transconductance of transistor 347 while S1 is high (setting a capture state within current mirror 335)—a voltage that is isolated (retained/captured) at the gate of the transistor after S1 goes low to decouple the gate of transistor from its drain. In the ensuing operational interval, top 2, S1 is held low while T1 is driven high (establishing a transmit mode within dynamic current mirror 335), coupling the drain of transistor 347 to output node 350 (via switch element 343) to drive/transmit a current corresponding to the trapped VGs (the potential captured on capacitive element 345) onto the output line. The operation of dynamic current mirror 337 is identical to that of dynamic current mirror 333, with the capture mode established in 337 during transmit mode of 335 and transmit mode in 337 during capture mode in 335.

Figure 9:
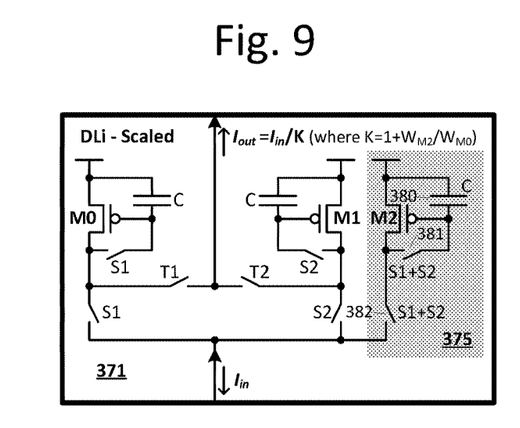
FIG. 9 illustrates an embodiment of a scaled dynamic current-mode latch element that scales output current $T_{out}$ by a factor of K relative to input current $I_{in}$.

In a number of dynamic current latch embodiments, a scaling function is included within each dynamic current-mode latch element to scale current-mode multiply-accumulate results to a range corresponding to the neural-net input (e.g., so that each MAC unit receives inputs within a given current range, thus avoiding cumulative current amplitudes, overflow and other complications). FIG. 9 illustrates an embodiment of a scaled dynamic current-mode latch element 371 that scales output current $I_{out}$ by a factor of K relative to input current $I_{in}$. As shown, the scaled DLi includes the parallel-coupled dynamic current mirrors shown in FIG. 8 together with a scaling component 375 formed by transistor "M2", capacitive element 380 and switch elements 381 and 382. The switch elements are closed in response to pulsing of either sampling signal (S1 or S2) to split the current flow constituting $I_{in}$ between the sample-enabled dynamic current mirror and scaling component 375. When S1 is asserted, for example, current flows through both transistor M0 (corresponding to transistor 347 in FIG. 8) and transistor M2 to form the input current ($I_{in}$), with those two currents having relative magnitudes according to respective transconductances of the M0 and M2 transistors. In one embodiment, transistor M2 is implemented with transconductance K−1 times the transconductance of transistor M0 (or transistor M1 which is matched to M0) so that the current flow through M0 is $I_{in}$/K during input capture, yielding an output current correspondingly scaled by K during the ensuing transmit phase. That is, $T_{out}$=In/K. Scaling may be achieved by adjusting the width/length ratio of transistor M2 relative to M0 (and M1), ganging transistors etc. In one embodiment, for example, transistor M2 is fabricated with a width K−1 times that of transistor M0 (and M1), with all other dimensions and implementation considerations kept static (e.g., same doping, etc.) so that K is given by 1+$W_{M2}$/$W_{M0}$, where 'W' refers to the width of the subscript-specified transistor). In other embodiments, the scaling factor K may be programmed by selectively (switchably) ganging transistors in parallel and/or series to effect a desired transconductance ratio between M2 and M0 (and between M2 and M1). Additional switching transistors may be provided to support such programmed transistor ganging and/or separate instances of switch elements 381, 382 may be provided with respect to individual transistors optionally to be included within a given transistor gang (e.g., to enable selected transistors to be decoupled from the ganged set of transistors that constitute a given one M0, M1 and/or M2).

Figure 10:
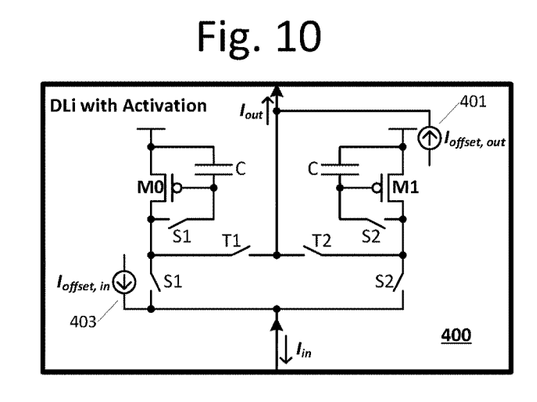
FIG. 10 illustrates another embodiment of a dynamic current-mode latch element, in this case including output and input offset-current sources and that enable an activation function (ramp) within perceptron layers of the neural network and operation with negative current values.

FIG. 10 illustrates yet another embodiment of a dynamic current-mode latch element 400, in this case including output and input offset-current sources 401 and 403 that enable (i) an activation function (ramp) within perceptron layers of the neural network and (ii) operation with negative current values, respectively. That is, the output offset-current source 401 yields a time-based ramp with clamp in the output current (an "activation" that implements, for example, a rectified linear unit function, ReLU) and the input offset-current source ensures source-to-drain current flow through transistors M0, M1 even when input current $I_{in}$ reverses direction (e.g., to reflect a negative value). A scaling component may also be included with the offset-current implementation and either of the offset currents (at input or output) may be omitted.

Figure 11:
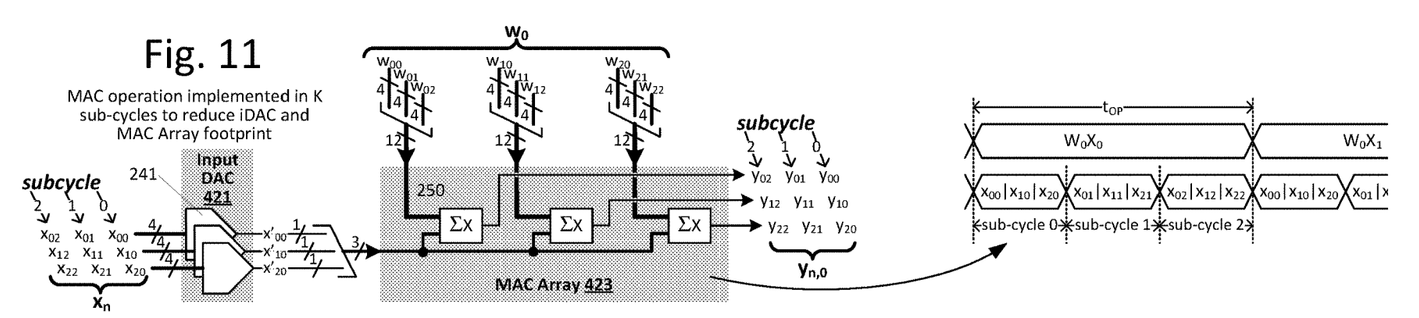
FIG. 11 illustrates alternative embodiments of an input DAC and MAC array that cyclically implement a matrix convolution with reduced hardware overhead.

FIG. 11 illustrates alternative embodiments of an input DAC 421 and MAC array 423 that cyclically implement a matrix convolution with reduced hardware overhead. That is, instead of supplying a separate input DAC per input matrix column and a separate multiply-accumulator unit per output matrix column as in FIG. 5, a reduced number of input DACs 241 (equal to the number of input matrix rows) and a reduced number of multiply-accumulators 250 (equal to the number of output matrix rows) operate on respective columns of input data in successive subintervals to produce successive columns of output data. In the implementation shown, each top interval is sub-divided into N sub-cycles according to the number of columns in the input matrix and columns in the output matrix—three sub-cycles (or sub-intervals) in this 3×3 matrix convolution example. As shown, each of the three multiply-accumulators 250 receives a respective row of digital weight values throughout the top interval, while input DAC 241 cycles through three columns of input data in respective sub-intervals. By this arrangement, the multiply-accumulators 250 generate a first column of output values during the first top sub-interval, a second column of output values during a second top sub-interval and a third column of output values during a third and final top sub-interval. In effect, the three multiply accumulators 250 perform an operation corresponding to the first, second and third rows of multiply-accumulators within the FIG. 5 embodiment during the first, second and third sub-intervals, respectively. Though not specifically shown, the column-sequential output values may be latched within a hardware-reduced current-mode latch (e.g., only having a number of DLi elements according to the row dimension of the output array—three DLi elements in this example instead of the nine DLi elements shown in FIG. 8) and thus forwarded to a downstream multiply-accumulator with sub-interval progression. Alternatively, the full output matrix may be assembled within an i-latch (e.g., performing a deserialization operation) for fully parallel presentation to downstream logic.

Figure 12:
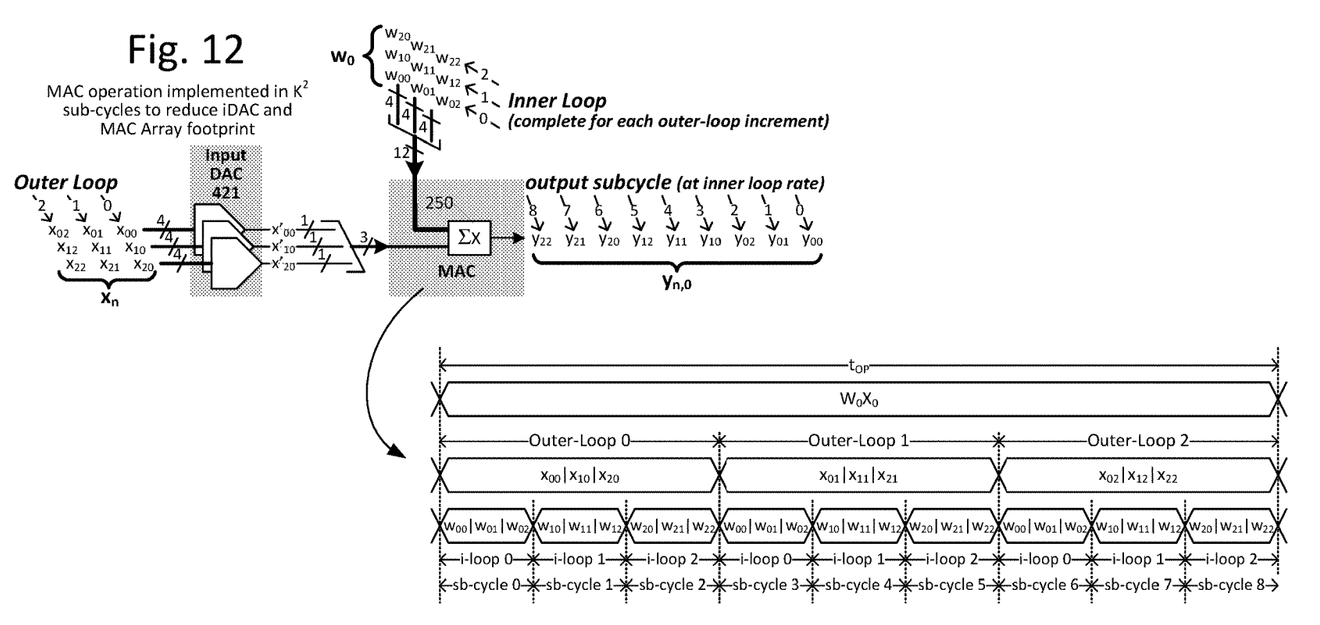
FIG. 12 illustrates an embodiment of a MAC array having a solitary multiply-accumulator stage coupled to receive column-by-column input data and row-by-row weighting data.

FIG. 12 illustrates an embodiment of a MAC array having a solitary multiply-accumulator stage 250 coupled to receive column-by-column input data (e.g., as in FIG. 11) in respective outer-loop intervals and to receive row-by-row weighting data within inner-loop intervals. In the 3×3 matrix convolution example shown, each time period within the three-interval outer loop is resolved into three inner-loop sub-intervals, thus rendering the total number of sub-intervals (inner-loop operation intervals) according to product of the column dimension of the input array and the row dimension of the weighting data array (3×3=9 sub-intervals in the depicted example). Thus, each value within the output matrix is generated in a respective sub-interval at the inner-loop rate. In one embodiment, a current latch deserializes the output data values into columns of data to be fed to a downstream multiply-accumulator (i.e., thus effecting data column-by-column current-mode data transfer during respective outer-loop intervals). For example, switching circuitry is provided within the downstream current-mode latch to route individual output values to in round-robin fashion to N dynamic current latch elements (e.g., one output current routed to a respective one of three DLi elements in respective inner-loop intervals) to provide column-grouped data for the downstream multiply-accumulator.

Figure 13:
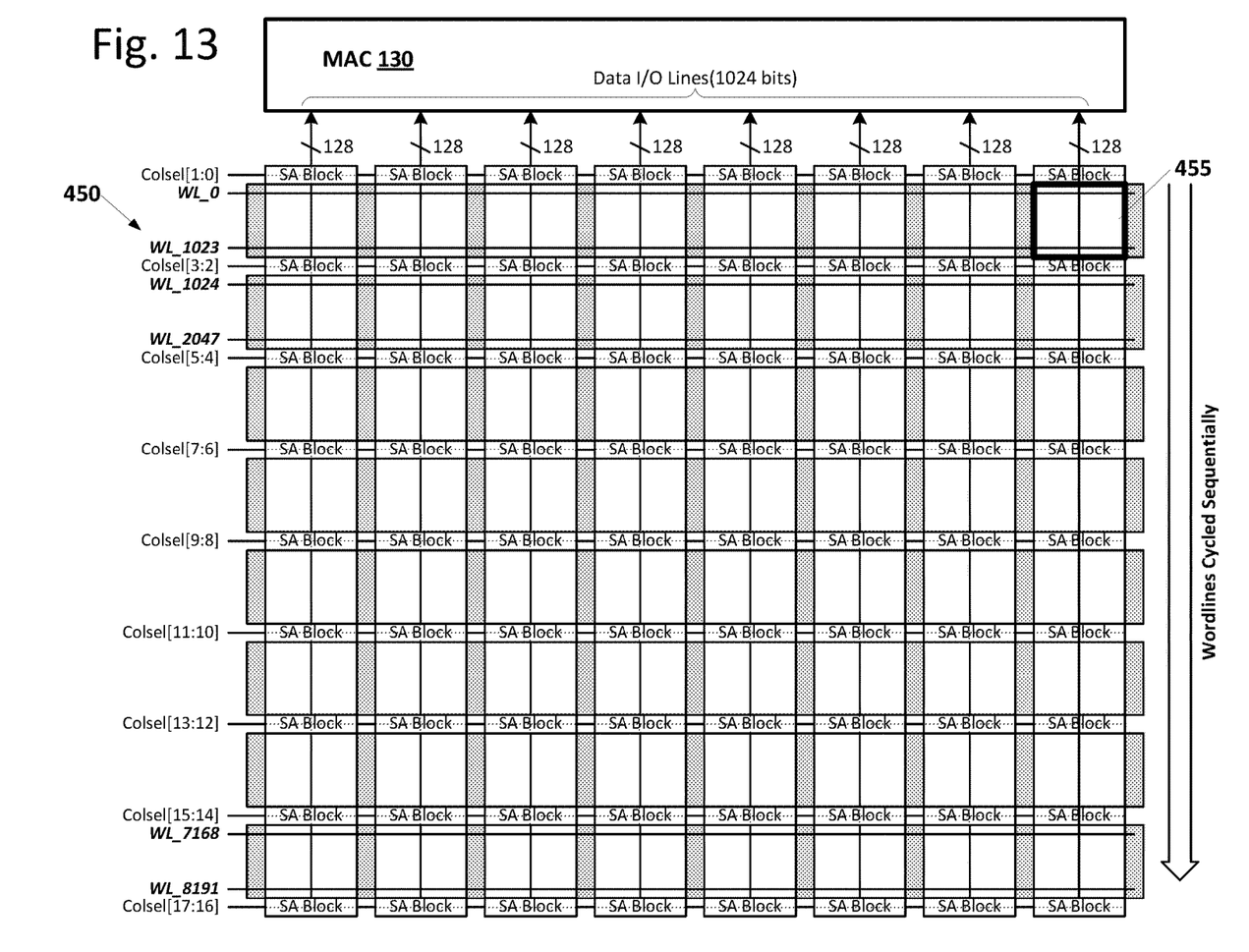
FIG. 13 an embodiment of a wide input/output (I/O) dynamic random access memory (DRAM) bank that may be used to feed weighting data to one or more MAC units within the neural pipeline shown in FIG. 1.

FIG. 13 an embodiment of a wide I/O DRAM bank 450 that may be used to feed weighting data to one or more MAC units 130 within the neural pipeline shown in FIG. 1. In one embodiment, column-select lines ("Colsel") and data input/output (I/O) lines are directionally swapped within bank 450, with the column-select lines running through banks of sense amplifiers (within sense amplifier blocks "SA Block") and data I/O lines running over the array to achieve a wide input/output data path—1024 bits per column access in the embodiment shown. Moreover, because MAC unit 130 and DRAM bank 450 (each being one of many) are co-located on a memory die, column data may be output directly to MAC unit 130 without the serialization deserialization overhead (circuitry, power, time) otherwise required to read data out of a conventional DRAM component and deliver to remote (off memory die) neural-net processing blocks. In alternative embodiments, MAC unit 130 and DRAM bank 450 may be implemented on respective/separate integrated circuit dies (with one die containing multiple instances of MAC unit 130 and the other containing multiple DRAM banks 450) disposed in stacked-die or lateral-die integrated circuit package. In a stacked-die implementation, for example, the data I/O lines extending from each bank 450 may be coupled to through-silicon-vias (TSVs) or other wide-interface chip-to-chip interconnects extending to the die containing MAC units 130 to provide low-latency, low-power chip-to-chip information transfer between the MAC units and DRAM banks (e.g., transferring weighting data and/or input data from the DRAM banks to the MAC units, transferring MAC result data to the DRAM banks, etc.).

In the FIG. 13 embodiment, the storage array is split into an 8×8 set of subarrays 455, each subarray having 1024 rows of storage cells with 512 storage cells per row organized in four individually accessible columns (i.e., 128 storage cells per column). Word lines extend across all eight sub-arrays 455 in the same row (forming a storage "stripe" within memory bank 450) to enable simultaneous activation of a row of storage cells within each spanned subarray—that is transfer of 8×512=4096 bits of data from the word-line-selected memory cells to the blocks of sense amplifiers disposed at either edge of the sub-array stripe. Column read and write operations may then be carried out with respect to individual columns of data (e.g., one of four 1024 bit columns in the example shown) within the sense amplifier blocks.

Figure 14:
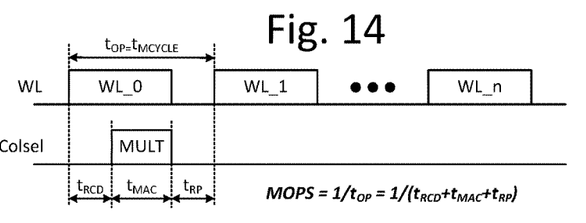
FIG. 14 illustrates an operational flow within the FIG. 13 memory bank in which word lines are asserted sequentially to deliver respective columns of digital weighting data to a corresponding MAC unit.

FIG. 14 illustrates an operational flow within the FIG. 13 memory bank in which word lines are asserted sequentially (WL_0, WL_1, etc.) to deliver respective 1024-bit columns of digital weighting data to the corresponding MAC unit (i.e., MAC unit 130 in FIG. 13 which may include multiple MAC units as discussed in reference to FIG. 3). Assuming that a new set of weighting data is delivered to the neural pipeline during successive top intervals, the minimum top duration (and thus maximal neural pipeline throughput in terms of multiply-accumulate operation per second (MOPS)) is set by the sum of the row activation time (i.e., time between commencement of row activation and commencement of column data output, referred to as the RAS-to-CAS delay or $t_{RCD}$), the time required for the multiply-accumulate operation ($t_{MAC}$) and the row precharge time, $t_{RP}$ (i.e., deasserting the word line and arming the sense amplifiers for a subsequent activation ("page-buffering") operation).

Figure 15:
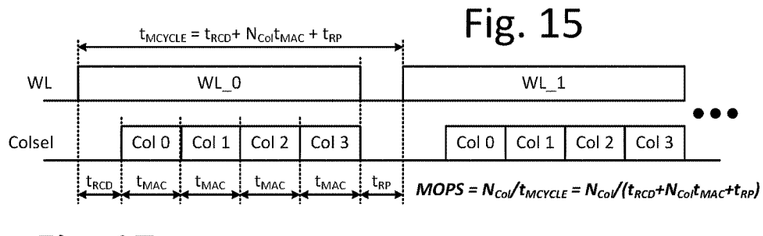
FIG. 15 illustrates an alternative flow in which the neural pipeline throughput is increased by reading out multiple columns of weighting data per row activation.

FIG. 15 illustrates an alternative flow in which the neural pipeline throughput (MOPS) is increased by reading out multiple columns of weighting data per row activation, with each column-readout feeding the neural net pipeline for a respective multiply-accumulate cycle, $t_{MAC}$. By this arrangement the row activation and precharge overhead (tRCD and tRP) are amortized over the multiple column readouts (NCol=4 in this example) so that the average operation interval, top, becomes $(t_{RCD}+N_{Col} \bullet t_{MAC}+t_{RP})/NCol$, or $t_{MAC}+(t_{RCD}+t_{RP})/NCol$.

Figure 16:
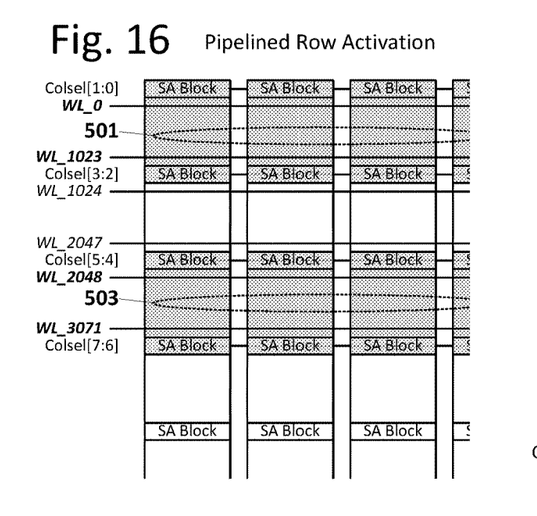
FIGS. 16 and 17 illustrate a pipelined row activation technique made possible by the deterministic weight data read-out sequence and the provision of independent sense amplifier banks for non-adjacent stripes of the DRAM bank.
Figure 17:
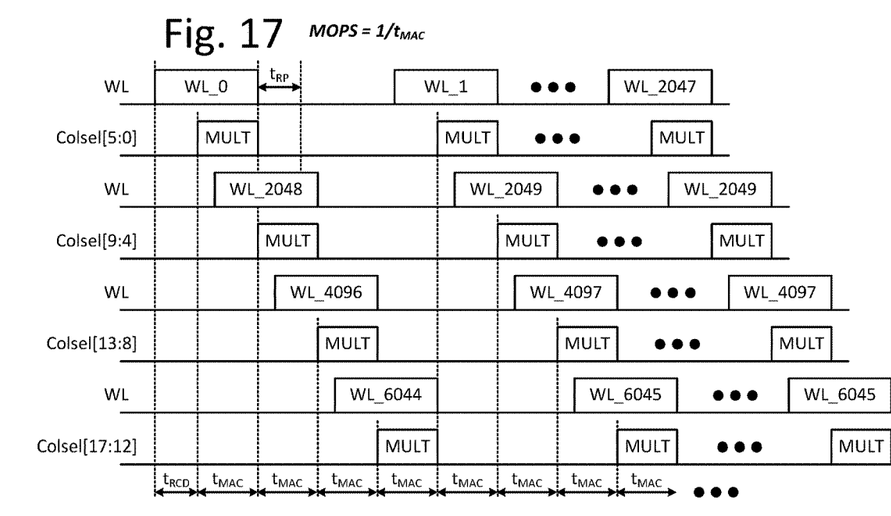

FIGS. 16 and 17 illustrate a pipelined row activation technique made possible by the deterministic weight data read-out sequence and the provision of independent sense amplifier banks for non-adjacent stripes of the DRAM bank. Referring to the two non-adjacent storage stripes 501 and 503 spanned by respective sets of word lines 0-1023 and 2048-3071, for example, because row activations within the two stripes yields data capture within distinct sets of sense amplifier banks, the row activations may be carried out concurrently (at least partly overlapping in time) with the row activation time for the subsequentially activated stripe executed during column data output from the first activated stripe and with the row precharge for the first activated stripe executed during column data output from the second stripe. As shown in FIG. 17, this staggered activation continues for subsequent non-adjacent stripes of the array, repeating at subsequent word line locations—stepping the word line index by 2048 modulus total word line count in each successive activation—to yield column readouts at the rate of the multiply-accumulate operation. That is, after an initial row activation interval for word line 0, top=$t_{MAC}$. Note that, as the word line index crosses a stripe boundary (e.g., incrementing from 1023 to 1024 or from 2047 to 0), the applicable set of column select lines changes. Thus, the total set of column-select lines applied to support column operations within the stripes crossed by word lines 0-2047 includes Colsel[5:0], with Colsel[3:0] supporting column operations in the stripe spanned by word lines 0-1023 and Colsel[5:2] supporting column operations in the stripe spanned by word lines 1024-2047. Similarly, the total set of column-select lines applied to support column operations within the stripes crossed by word lines 2048-4095 includes Colsel[9:4], with Colsel[7:4] supporting column operations in the stripe spanned by word lines 2048-3071 and Colsel[9:6] supporting column operations in the stripe spanned by word lines 3072-4095.

Figure 18:
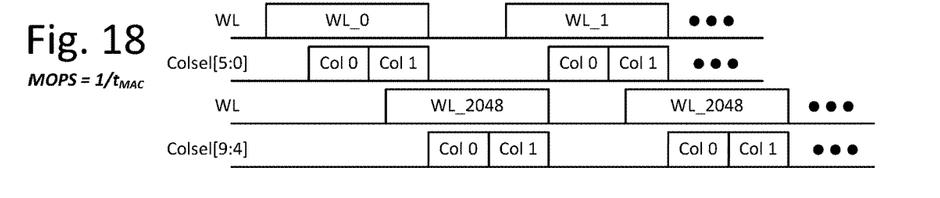
FIG. 18 illustrates an alternative data readout approach that also leverages the concurrent row-activation sequence, but with multiple column readouts per row activation.

FIG. 18 illustrates an alternative data readout approach that also leverages the concurrent (time-staggered) row-activation sequence, but with multiple column readouts (two in this example) per row activation. Again, the operational interval, top is constrained only by the multiply-accumulate latency so that top=$t_{MAC}$ and MOPS=$1/t_{MAC}$.

The various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the memory array (or subarray) sizes, matrix sizes, bit-depths, number of neural-net layers, MAC units per storage bank, storage cell technologies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line (e.g., with digital or analog signals time-multiplexed thereon), and each of the single signal lines can alternatively be buses. Signals and signaling links, however shown or described, can be single-ended or differential. Logic signals shown as having active-high assertion or "true" states, may have opposite assertion states in alternative implementations. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated-circuit neural network (neural network IC) comprising:
    a storage array; and
    a plurality of multiply-accumulate (MAC) units coupled in a chain, each multiply-accumulate unit having:
        a digital input port to receive a matrix of digital-weight values from the storage array;
        an analog input port to receive a matrix of analog input signals, each analog input signal exhibiting a respective electronic current representative of input value; and
        multiply-adder circuitry to generate a matrix of analog output signals by convolving the matrix of digital-weight values with the matrix of analog input signals including, for each analog output signal within the matrix of analog output signals, switchably enabling weighted current contributions to the analog output signal based on logic states of on respective bits of one or more of the digital-weight values.

2. The neural network IC of claim 1 wherein the multiply-adder circuitry comprises circuitry to:
    multiply a column of N analog input signals within the matrix of analog input signals with a row of N digital weight values within the matrix of digital weight values to produce, as multiplication products, N output currents on respective current-contribution conductors; and
    an output conductor coupled to each of the current-contribution conductors to yield, as a respective analog output signal within the matrix of analog output signals, a wired sum of the N output currents.

3. The neural network IC of claim 2 wherein the circuitry to multiply the column of N analog input signals with the row of N digital weight values comprises N multiplier circuits for which the current-contribution conductors constitute respective signal outputs.

4. The neural network IC of claim 3 wherein each multiplier circuit of the N multiplier circuits receives a respective one of the N analog input signals and a respective one of the N digital weight values and comprises circuitry to switchably couple one or more of a plurality of current sources to the respective current-contribution conductor in accordance with the one of the N digital weight values.

5. The neural network IC of claim 4 wherein the circuitry to switchably couple one or more of the plurality of current sources to the respective current-contribution conductor comprises circuitry to switchably couple a first one of the current sources to the current-contribution conductor according to a state of a most significant bit of the one of the digital weighting values and to switchably couple a second one of the current sources to the current-contribution conductor according to a state of a less significant bit of the one of the digital weighting values.

6. The neural network IC of claim 5 wherein current flow from the first one of the current sources is twice the current flow from the second one of the current sources.

7. The neural network IC of claim 4 wherein current flow from each of the plurality of current sources varies between maximum and minimum current levels in accordance with the respective one of the N analog input signals.

8. The neural network IC of claim 4 wherein at least one of the MAC units additionally comprises a current-mode latch to store values representative of the matrix of analog output signals generated by an upstream MAC unit at conclusion of a first interval and to output, based on the values stored within the current-mode latch, a matrix of analog input signals to the multiply-adder circuitry within the at least one of the MAC units during a second interval subsequent to the first interval.

9. The neural network IC of claim 8 wherein the current-mode latch comprises:
    a capacitive element that is charged to a voltage potential corresponding to a current-mode signal within the matrix of analog output signals to store a value representative of the first current-mode signal at conclusion of the first interval; and
    a voltage-controlled current source to which the voltage potential of the capacitive element is applied to generate a current-mode signal within the matrix of analog input signals supplied to the multiply-adder within the at least one of the MAC units during the second interval.

10. The neural network IC of claim 1 wherein the storage array comprises a dynamic random access memory (DRAM) having a plurality of column output lines that extend across rows of DRAM cells, and wherein the MAC units are coupled to the column output lines to receive the digital-weight values.

11. The neural network IC of claim 10 wherein the DRAM comprises a plurality of sense amplifier banks and control circuitry to concurrently activate two or more rows of the DRAM cells such that contents of two or more rows of DRAM cells are transferred to and simultaneously resident within respective subsets of the sense amplifier banks.

12. The neural network IC of claim 11 wherein the control circuitry to concurrently activate the two or more rows of the DRAM cells comprises circuitry to commence activation of a first row of the DRAM cells prior to executing a precharge operation with respect to a previously activated second row of the DRAM cells, and wherein first weighting data transferred from the second row of the DRAM cells to a first subset of the sense amplifier banks is provided from the first subset of the sense amplifier banks to one or more of the MAC units during transfer of second weighting data from the first row of the DRAM cells to a second subset of the sense amplifier banks.

13. A method of operation within an integrated-circuit neural network (neural network IC) having a plurality of multiply-accumulate (MAC) units coupled in a chain, the method comprising:
    receiving, via a digital input port of each MAC unit, a respective matrix of digital-weight values from a storage array implemented within the neural network IC;
    receiving, via an analog input port of each MAC unit, a respective matrix of analog input signals, each analog input signal exhibiting a respective electronic current representative of input value; and
    generating, within each MAC unit, a matrix of analog output signals by convolving the matrix of digital-weight values with the matrix of analog input signals including, for each analog output signal within the matrix of analog output signals, switchably enabling weighted current contributions to the analog output signal based on logic states of on respective bits of one or more of the digital-weight values.

14. The method of claim 13 wherein the convolving the matrix of digital-weight values with the matrix of analog input signals comprises multiplying a column of N analog input signals within the matrix of analog input signals with a row of N digital weight values within the matrix of digital weight values to produce, as multiplication products, N output currents on respective current-contribution conductors, current-contribution conductors being coupled to a common output conductor to yield, as a respective analog output signal within the matrix of analog output signals, a wired sum of the N output currents.

15. The method of claim 14 wherein multiplying the column of N analog input signals with the row of N digital weight values multiplying respective ones of the N analog input signals with corresponding ones of the N digital weight values within N multiplier circuits for which the current-contribution conductors constitute respective signal outputs.

16. The method of claim 15 wherein multiplying respective ones of the N analog input signals with corresponding ones of the N digital weight values comprises, for each one of the analog input signals and each corresponding one of the N digital weight values, switchably coupling one or more of a plurality of current sources to the respective current-contribution conductor in accordance with the one of the N digital weight values.

17. The method of claim 16 wherein switchably coupling one or more of the plurality of current sources to the respective current-contribution conductor comprises switchably coupling a first one of the current sources to the current-contribution conductor according to a state of a most significant bit of the one of the digital weighting values and switchably coupling a second one of the current sources to the current-contribution conductor according to a state of a less significant bit of the one of the digital weighting values.

18. The method of claim 17 wherein current flow from the first one of the current sources is twice the current flow from the second one of the current sources.

19. The method of claim 16 wherein current flow from each of the plurality of current sources varies between maximum and minimum current levels in accordance with the respective one of the N analog input signals.

20. The method of claim 13 wherein the storage array comprises a dynamic random access memory (DRAM) having a plurality of column output lines that extend across rows of DRAM cells, and wherein receiving, via a digital input port of each MAC unit, a respective matrix of digital-weight values from a storage array implemented within the neural network IC comprises receiving the respective matrix of digital-weight values via the column output lines.

21. The method of claim 20 further comprising concurrently activating two or more rows of the DRAM cells such that contents of two or more rows of DRAM cells are transferred to and simultaneously resident within respective subsets of sense amplifier banks within the DRAM.

22. An integrated-circuit neural network (neural network IC) comprising:
    a storage array;
    a plurality of multiply-accumulate (MAC) units coupled in a chain, each multiply-accumulate unit including:
        means for receiving a respective matrix of digital-weight values from the storage array;
        means for receiving a respective matrix of analog input signals, each analog input signal exhibiting a respective electronic current representative of input value; and
        means for generating a matrix of analog output signals by convolving the matrix of digital-weight values with the matrix of analog input signals including, for each analog output signal within the matrix of analog output signals, switchably enabling weighted current contributions to the analog output signal based on logic states of on respective bits of one or more of the digital-weight values.

\* \* \* \* \*